(12) United States Patent
Miyanaga

(10) Patent No.: US 8,968,132 B2
(45) Date of Patent: Mar. 3, 2015

(54) CHAIN

(71) Applicant: Tsubakimoto Chain Co., Osaka (JP)

(72) Inventor: Syota Miyanaga, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 264 days.

(21) Appl. No.: 13/753,608

(22) Filed: Jan. 30, 2013

(65) Prior Publication Data

US 2013/0203538 A1 Aug. 8, 2013

(30) Foreign Application Priority Data

Feb. 3, 2012 (JP) ................. 2012-022253

(51) Int. Cl.
*F16G 13/04* (2006.01)
*F16G 13/08* (2006.01)

(52) U.S. Cl.
CPC ............... *F16G 13/04* (2013.01); *F16G 13/08* (2013.01)
USPC ............................ 474/213; 474/214; 474/206

(58) Field of Classification Search
USPC .......................... 474/213, 214, 206
See application file for complete search history.

(56) References Cited

U.S. PATENT DOCUMENTS

| | | | | |
|---|---|---|---|---|
| 5,098,349 A | * | 3/1992 | Wu | 474/206 |
| 6,325,735 B1 | * | 12/2001 | Kanehira et al. | 474/212 |
| 6,383,105 B1 | * | 5/2002 | Matsuno et al. | 474/213 |
| 7,419,449 B2 | * | 9/2008 | Tohara et al. | 474/213 |
| 2009/0042683 A1 | * | 2/2009 | Tohara | 474/213 |
| 2010/0267504 A1 | * | 10/2010 | Miyazawa et al. | 474/140 |
| 2012/0071287 A1 | * | 3/2012 | Hirai | 474/214 |
| 2012/0157252 A1 | * | 6/2012 | Yoshida et al. | 474/213 |
| 2012/0196712 A1 | * | 8/2012 | Miyanaga | 474/213 |
| 2013/0059691 A1 | * | 3/2013 | Miyanaga | 474/214 |
| 2014/0187371 A1 | * | 7/2014 | Lee | 474/140 |

FOREIGN PATENT DOCUMENTS

| | | |
|---|---|---|
| GB | 2494301 A | 3/2013 |
| JP | 2008025744 A | 2/2008 |
| JP | 201043653 A | 2/2010 |

OTHER PUBLICATIONS

British Intellectual Property Office Search Report, Jun. 14, 2013 in application No. GB1301181.2.

* cited by examiner

*Primary Examiner* — William A Rivera
*Assistant Examiner* — Michael Riegelman
(74) *Attorney, Agent, or Firm* — Howson & Howson LLP

(57) ABSTRACT

In a transmission chain including alternately interleaved and articulably connected sets of link plates, the link plates of least one of the sets have back surfaces arranged for sliding contact with a chain guide. These back surfaces have a convex, substantially arc-shaped, curvature in the longitudinal direction of the chain, and a convex, substantially arc-shaped, curvature in the widthwise direction. The radius of curvature of the widthwise curve of the back surface of each of the link plates of the at least one set is at least as great as the radius of curvature of the curve of the same link plate in the longitudinal direction.

7 Claims, 4 Drawing Sheets

CHAIN WIDTHWISE DIRECTION

CHAIN LONGITUDINAL DIRECTION

CHAIN WIDTHWISE DIRECTION

CHAIN WIDTHWISE DIRECTION

CHAIN LONGITUDINAL DIRECTION

CHAIN LONGITUDINAL DIRECTION

CHAIN WIDTHWISE DIRECTION

CHAIN

CROSS REFERENCE TO RELATED APPLICATION

The disclosure of Japanese Patent Application No. 2012-022253, filed on Feb. 3, 2012 is incorporated by reference.

FIELD OF THE INVENTION

This invention relates to a chain comprising a plurality of first links and a plurality of second links, each link being composed of one or more link plates. The first and second links are arranged alternately along the length of the chain, with the plate or plates of each of the first links interleaved with, i.e., extending in overlapping relationship between, plates of two adjacent second links, and connected articulably by connecting pins extending through pin holes of the link plates. The link plates may be formed with teeth for engagement with sprocket teeth, and have backs for sliding engagement with chain guides.

The chain can be a silent chain of the kind used industrial machinery or in an automobile engine. However, advantages of the invention can be realized in other kinds of transmission chains.

BACKGROUND OF THE INVENTION

Chains of the kind described above can have curved back surfaces for sliding contact a chain guide. An example of a known chain of this kind is described in United States Patent Application Publication No. 2008/0020882, published on Jan. 24, 2008.

As shown in FIGS. 4A and 4B of this application, a plate 510, which can be a plate of a chain in which all of the link plates are identical, has a curved back surface 514 for sliding contact with a chain guide (not shown). In such a chain, the area of contact between the back surface 514 and the chain guide increases over time, and wear loss of the chain increases. In this prior art chain, the shape of the back surface 514 in the widthwise direction of the chain is a straight line Ct5, as shown in FIG. 4B, and the shape of the back surface in the longitudinal direction is an arc-shaped curve Ce5 having a radius of curvature Re5, as shown in FIG. 4A.

The chain travels within a space in which lubricating oil comes into contact with all parts of the chain. Droplets of the oil adhere to the back surface 514 of each link plate 510 of the first and second links in regions thereof that do not come into contact with the chain guide. When the chain is in motion, air in the oil space acts on the oil droplets adhering to the back surfaces 514 of the link plates causing the oil to flow on the back surfaces.

When the back surface 514 is straight in the widthwise direction, as shown by straight line Ct5 in FIG. 4B, most of the oil on the back surface 514 flows in the longitudinal direction of the chain as indicated by arrows in FIG. 4C. Therefore, the time during which the oil is held on the back surface 514 is prolonged, and lubricating performance is favorable. That is, the back surfaces of the link plates exhibit good oil holdability, and friction between the back surface 514 and the chain guide is low.

On the other hand, in the case of a chain in which the back surfaces are straight in the widthwise direction, only a small amount of lubricating oil flows from the back surfaces 514, along the side surfaces 512 of the plates and through the narrow gaps between overlapping plates, to the pin holes 513, through which the connecting pins extend. Thus lubrication of the connecting pins and the pin holes becomes inadequate, and excessive wear between the pins and the inner surfaces 515 of the pin holes can result in elongation of the chain.

When the back surfaces of the link plates have a widthwise shape in the form of an arc-shaped curve Ct6, as shown in FIGS. 5A, 5B and 5C, and the radius of curvature Rt6 of curve Ct6 is smaller than the radius of curvature Re6 of the longitudinal curve of the link plate backs, the contact area, between the back surfaces 614 of the link plates 610 and the chain guide is reduced. In this case, droplets of oil adhering to the back surface 614 flow readily from the back surface 614 and along both sides 612 of the link plates as indicated by arrows in FIGS. 5A and 5C. Accordingly, flow of oil to the pin holes 613 from the back surface 614 increases, and wear of the connecting pins and the inner surfaces 615 of the pin holes is reduced and premature elongation of the chain is avoided.

However, the backs of the link plates in FIGS. 5A-5C have reduced oil holdability, and consequently, friction between the back surfaces 614 and the chain guide or guides is greater. Moreover, because of the small radius of the widthwise curvature of the link plates, the contact area between the link plates and the chain guide is low and contact pressure is high. Because of inadequate lubrication and high contact pressure, excessive wear of the back surfaces 614, and of the chain guide, can occur.

Wear elongation of the chain, and wear between the back surfaces of the link plates and the chain guide, degrade the durability of the chain and the chain guide. Accordingly, there is a need for a chain that exhibits reduced friction and wear and improved durability, and which also contributes to improvement in the durability of a chain guide.

SUMMARY OF THE INVENTION

The chain in accordance with the invention comprises a plurality of first links, each composed of at least one first link plate and a plurality of second links each composed of at least one second link plate. The first and second links are disposed in alternating relationship along a longitudinal direction of the chain, with each link plate of each first link being interleaved with link plates of two adjacent second links. The link plates have pin holes for receiving connecting pins, and side surfaces. Connecting pins extend in a widthwise direction of the chain through pin holes in the link plates of the first and second links and articulably connect the first and second links of the chain. Each of the link plates of at least one of the two pluralities of links is a sliding contact link plate. The sliding contact link plates of the chain have back surfaces for sliding contact with a chain guide. The longitudinal cross sections of each of said back surfaces are in the form of a convex, substantially arc-shaped, longitudinal curve, and the widthwise cross sections of each of said back surfaces are also in the form of a convex, substantially arc-shaped, widthwise curve. The radius of curvature of the widthwise curve of the back surface of each of the link plates of said at least one of said first and second pluralities of links is at least as great as the radius of curvature of the longitudinal curve of the back surface of the same link plate.

Because the radius of curvature of the widthwise curve is not smaller than the radius of curvature of the longitudinal curve, oil holdability is improved, and lubrication between the chain and the chain guide is improved. In addition, the large radius of curvature of widthwise curve reduces contact pressure between the backs of the link plates and the chain guide, reducing friction and improving power transmission efficiency. The large radius of curvature also improves the durability of the chain transmission by suppressing wear of the backs of the link plates and the chain guide.

The widthwise curvature of the backs of the link plates enhances flow of oil from the backs of the link plates, over the side surfaces of the link plates, and into the pin holes. This flow of oil improves the lubrication of the gaps between the connecting pins and the surfaces of the pin holes, suppressing wear and elongation of the chain, and improving the durability of the chain. The flow of oil on the side surfaces of the link plates also improves lubrication of the interfaces between adjacent overlapping link plates.

According to a second aspect of the invention, the chain can be a silent chain in which each of the first links is a guide row composed of a pair of guide plates spaced from each other in the widthwise direction, and at least one first link plate disposed between the pair of guide plates, and in which each of the second links is a non-guide row composed of a plurality of second link plates. In this chain, the link plates of both pluralities are sliding contact link plates.

In this chain, oil holdability is improved on the back surfaces of the links plates, both in the guide rows and in the non-guide rows. Accordingly, a substantial reduction in friction between the link plates and a chain guide, and between the connecting pins and the pin holes, can be realized. Superior suppression of wear can be achieved, and elongation of the chain due to wear of the connecting pins and the pin holes is reduced by enhanced flow of oil from the back surfaces of the link plates and along the side surfaces, into the pin holes.

According to a third aspect of the invention wherein the chain is a silent chain in which each of the first links is a guide row composed of a pair of guide plates spaced from each other in the widthwise direction, at least one first link plate is disposed between the pair of guide plates, and each of the second links is a non-guide row composed of a plurality of second link plates, the link plates of said second links are sliding contact link plates, and the link plates of the first links are positioned in relation to the link plates of the second links so that the link plates of the first links remain out of contact with a chain guide while link plates of adjacent second links are in sliding contact with the same chain guide.

With this arrangement, oil holdability on the back surfaces of the link plates in the non-guide rows is improved, friction is reduced, and wear is suppressed. Frictional losses are also reduced because the link plates of the guide rows do not contact the chain guide and the contact area between the silent chain and the chain guide is thereby reduced.

In accordance with a fourth aspect of the invention, wherein the chain is a silent chain, each of the first links is a guide row composed of a pair of guide plates spaced from each other in the widthwise direction, at least one first link plate is disposed between the pair of guide plates, and each of the second links is a non-guide row composed of a plurality of second link plates, the link plates of said first links are sliding contact link plates, and the link plates of the second links are positioned in relation to the link plates of the first links so that the link plates of the second links remain out of contact with a chain guide while link plates of adjacent first links are in sliding contact with the same chain guide.

With this arrangement as in the previously described arrangement, oil holdability on the back surfaces of the link plates in the guide rows is improved, friction is reduced, and wear is suppressed. Frictional losses are also reduced because the link plates of the non-guide rows do not contact the chain guide and the contact area between the silent chain and the chain guide is thereby reduced.

According to a fifth aspect of the invention, the guide plates have backs positioned in relation to the adjacent link plates that slide on a chain guide such that the backs of the guide plates remain out of sliding contact with the chain guide. Because the guide plates remain out of contact with the chain guide the contact area between the silent chain and the chain guide is reduced, and frictional losses are reduced.

DETAILED DESCRIPTION OF THE PREFERRED EMBODIMENTS

Figure 1:
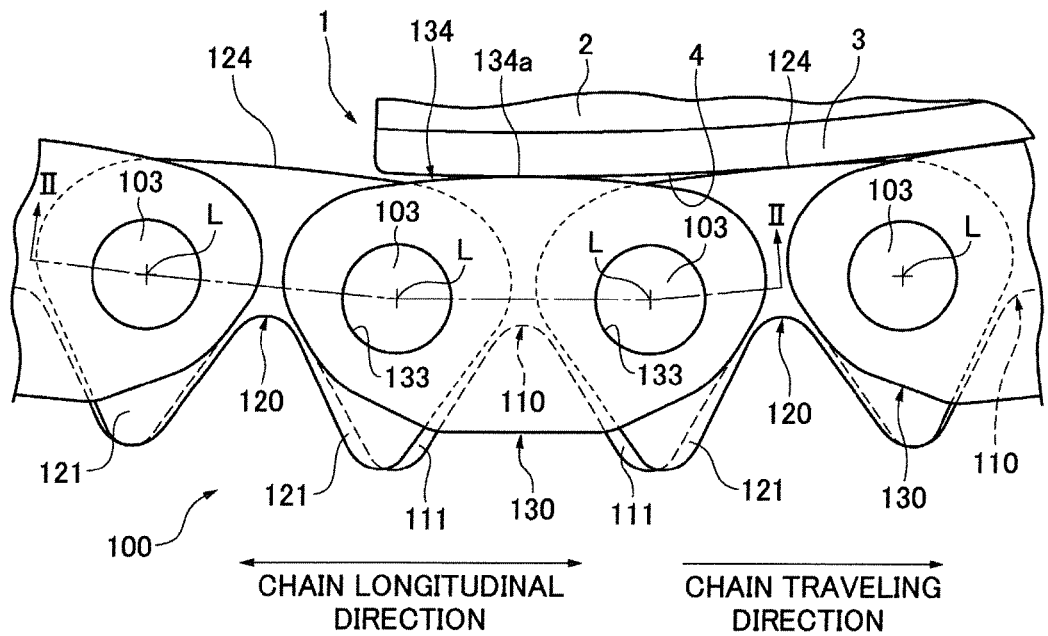
FIG. 1 is a side elevational view of a part of a silent chain according to the invention showing the chain in sliding contact with a chain guide

The chain 100 depicted FIGS. 1, 2 and 3A through 3C is an endless transmission chain used to transmit power from a driving sprocket to one or more driven sprockets in a machine. A typical application for such a chain is the transmission of power from the crankshaft to one or more camshafts in the timing drive of an automobile engine.

A chain transmission may include one or more chain guides arranged for sliding engagement with a back of the chain, for guiding the chain as it travels from one sprocket to another. A part of such a guide is shown as guide 1 in FIG. 1.

The chain guide 1 may be a stationary guide, or movable guide that is biased against the chain by a chain tensioner. The chain guide 1 is composed of a base 2 and a shoe 3 supported by the base 2 and having a surface 4 on which the chain 100 slides.

The shoe 3 is formed of a wear-resistant synthetic resin or other material that exhibits good wear resistance. The surface 4 of the shoe typically an elongated surface having a convex, gradually curved, arc-like, cross-sectional shape in longitudinal planes orthogonal to surface 4, and straight transverse cross-sections.

The chain transmission is typically located within an oil-tight enclosure. In the case of an engine timing drive, the enclosure is formed by the engine block and a timing chain cover. The timing drive is lubricated by oil supplied to the enclosure by the engine oil pump. While the engine is in operation, the sprockets, the chain, and the chain guide or guides, are continuously exposed to an atmosphere containing droplets of oil.

Figure 2:
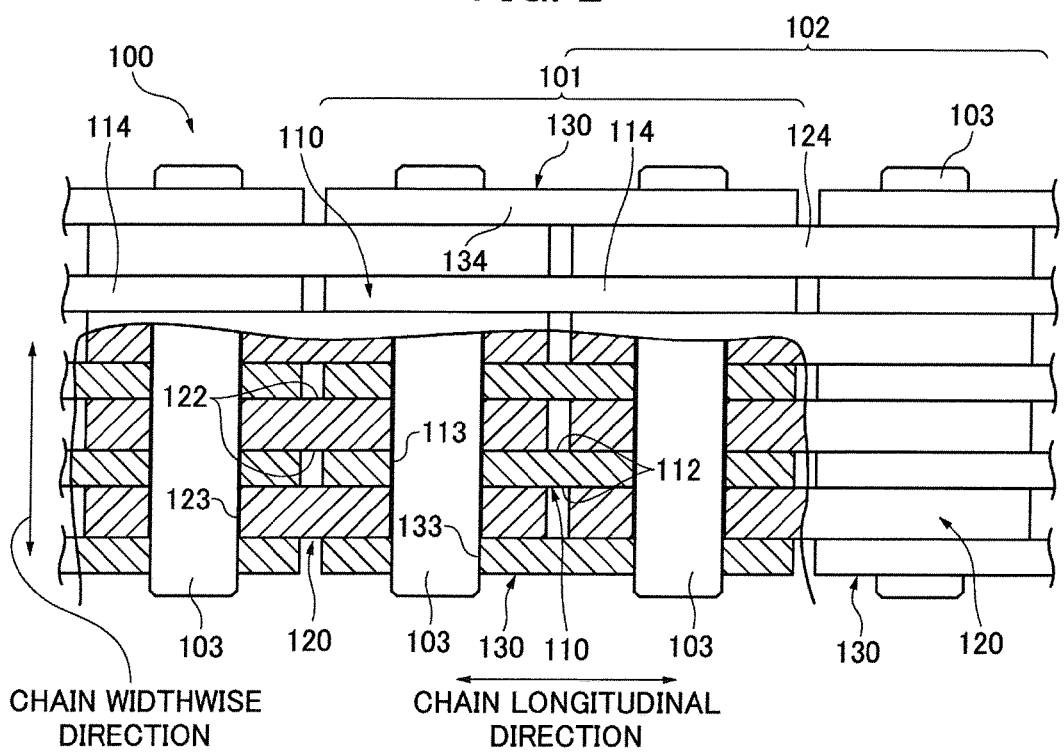
FIG. 2 is a top plan view of the silent chain of FIG. 1, partly in section, the section being taken on surface II-II in FIG. 1.

As shown in FIG. 2, the chain 100 comprises guide rows 10, each composed of one or more first link plates along with a pair of guide plates, and non-guide rows 102, each composed of a plurality of second link plates. The guide rows and non-guide rows are arranged alternately along the length of the chain with the link plates of each guide row interleaved with the link plates of each of two adjacent non-guide. Connecting pins 103 connect guide rows 101 and the non-guide rows 102 while allowing articulating movement of the guide rows and non-guide rows about the axes L (FIG. 1) of the connecting pins as the chain travel around driving and driven sprockets and as it travels in sliding contact with the surface 4 of the shoe 3. The axes L of the pins extend widthwise of the chain and extend through the centers of pin holes 113 and 123 of the link plates 110 and 120.

In each guide row 101, one or more first link plates 110 are disposed between a pair of guide plates 130 opposed to each other in spaced relationship in the widthwise direction of the chain. Each non-guide row 102 is composed of a plurality of second link plates 120 spaced from one another in the widthwise direction of the chain so that the second link plates are interleaved with the one or more first link plates of the guide rows. The number of second link plates 120 in each non-guide row exceeds by one the number of first link plates 110 in each guide row.

Each first link plate 110 has a pair of teeth 111 for engagement with sprocket teeth, a pair of opposite side surfaces 112 facing in the widthwise direction, and a back surface 114 extending from one side surface 112 to the other. A portion of the back surface can slide on surface 4 of the shoe of the chain guide 1.

Each of the second link plates 120 also has a pair of teeth 121 for engagement with sprocket teeth, a pair of opposite side surfaces 122 facing in the widthwise direction, and a back surface 124 extending from one of the side surfaces 122 to the other. The back surfaces 124 also have portion that can slide on surface 4 of the chain guide 1.

Each connecting pin 103 extends through, and fits rotatably in, pin holes 113 of the first link plates 120 and pin holes 123 of the second link plates 120. The rotatable relationship between the pins and the pin holes of both sets of link plates facilitates assembly of the chain, and the rotatable relationship between the pins and the pin holes of the second link plates 120 allows articulation of the non-guide links relative to the guide links.

Each of the guide plates 130 is formed with a pair of pin-retaining holes 133 which retain end portions of the connecting pins 103. The connecting pins can be retained in the pin-retaining holes of the guide plates by any of various means such as caulking or stop pins. As will be noted below, if the backs of the guide plates are recessed so that they do not contact the chain guide, the connecting pins can be fixed to the guide plates, for example by press-fitting.

Each guide plate 130 has a pair of opposite side surfaces facing to the widthwise direction and a back surface 134, extending from one of the side surfaces to the other, and having a portion for sliding contacts with surface 4 of the chain guide.

As shown in FIG. 3, the link plates of at least one of the sets of first and second links are sliding contact link plates 150, having a back surface 154 with a portion for sliding contact with the surface 4 of the guide shoe 3. In the embodiment illustrated in FIG. 1, both the first and second plates 110 and 120 are sliding contact link plates having a back surface with a sliding contact portion.

The thicknesses of first and second plates 110 and 120 differ as shown in FIG. 2, but the shapes of the first and second link plates 110 and 120 in the embodiment shown are otherwise the same.

Figure 3A:
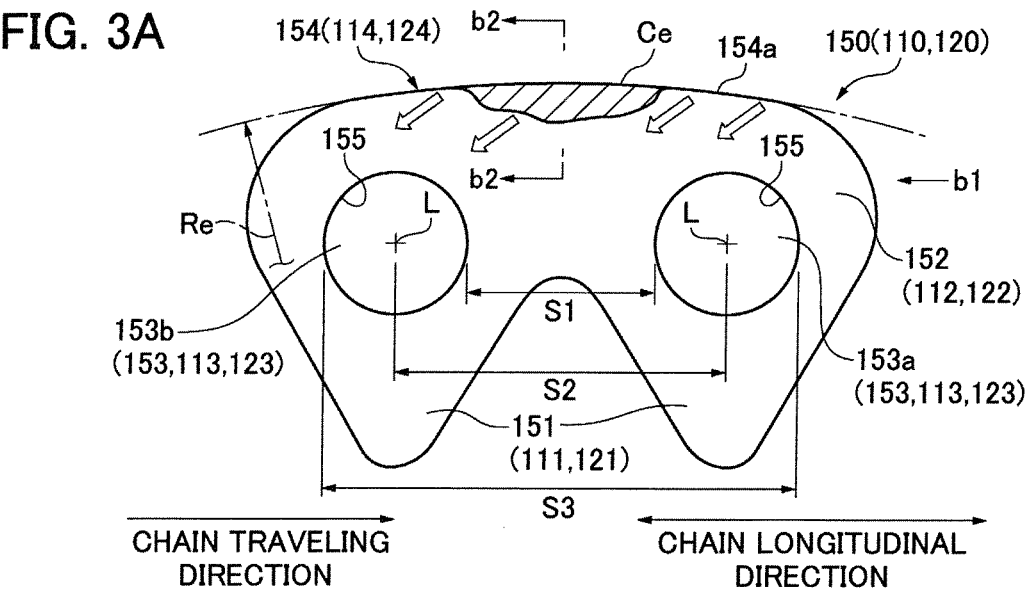
FIG. 3A is a side elevational view, partly in section of a link plate of the chain of FIG. 1, the section being taken on plane a-a in FIG. 3B.
Figure 3B:
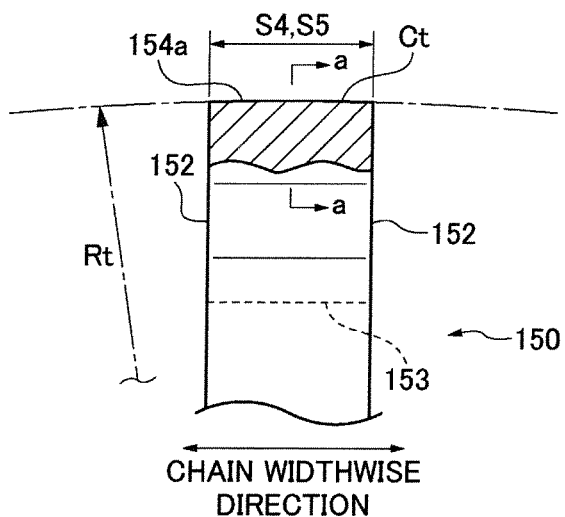
FIG. 3B is an enlarged fragmentary end elevational view, partly in section, of the link plate of FIG. 3A, the section being taken on plane b2-b2 in FIG. 3A.
Figure 3C:
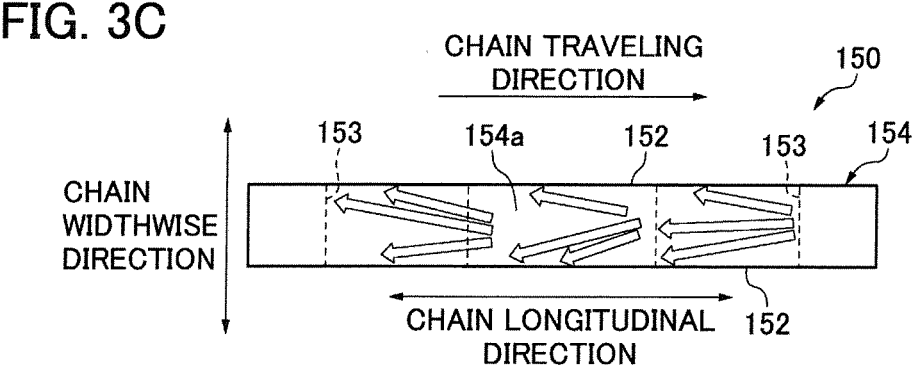
FIG. 3C is a top plan view of the link plate of FIGS. 3A and 3B.
Figure 4A:
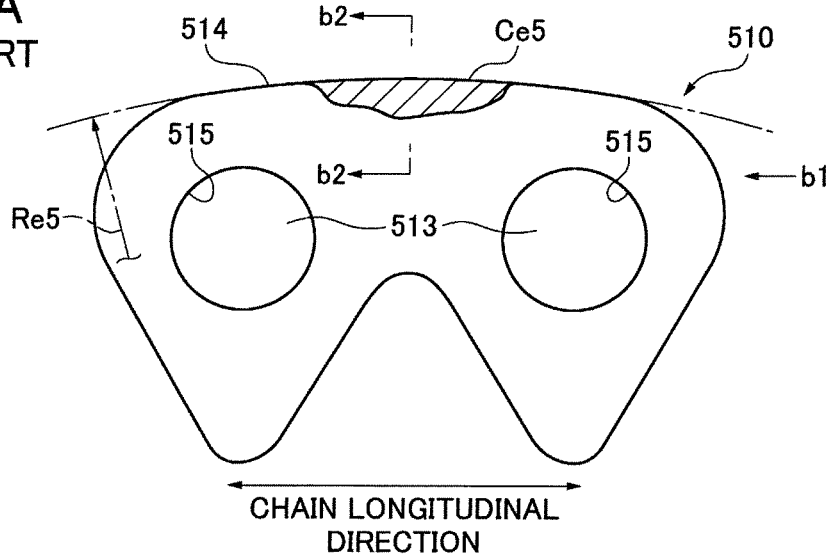
FIGS. 4A, 4B and 4C are views, corresponding respectively to FIGS. 3A, 3B and 3C, showing a first prior art link plate.
Figure 4B:
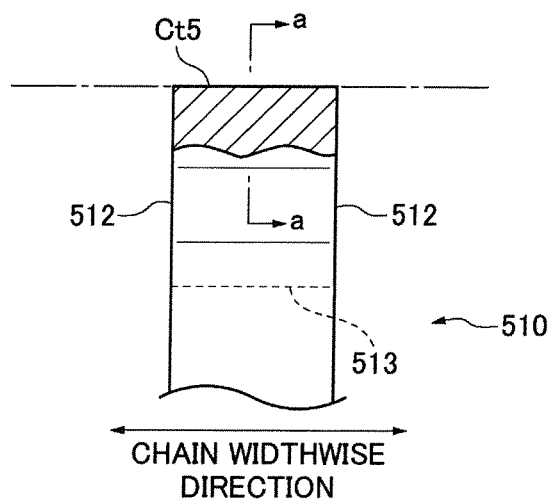
Figure 4C:
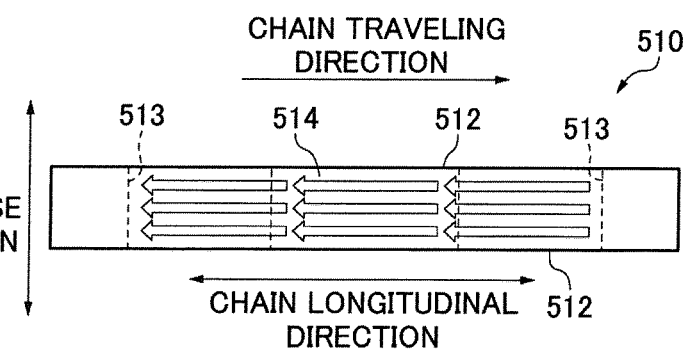
Figure 5A:
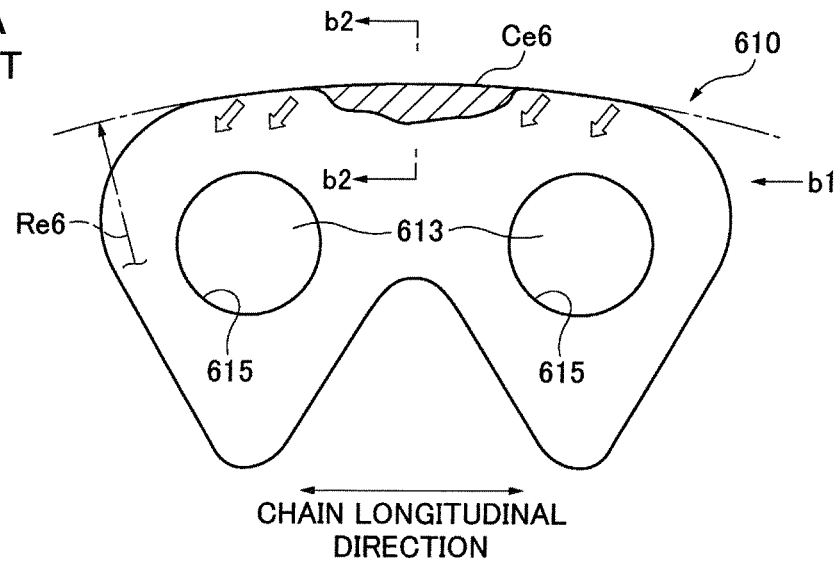
FIGS. 5A, 5B and 5C are views, corresponding respectively to FIGS. 3A, 3B and 3C, showing a second prior art link plate.
Figure 5B:
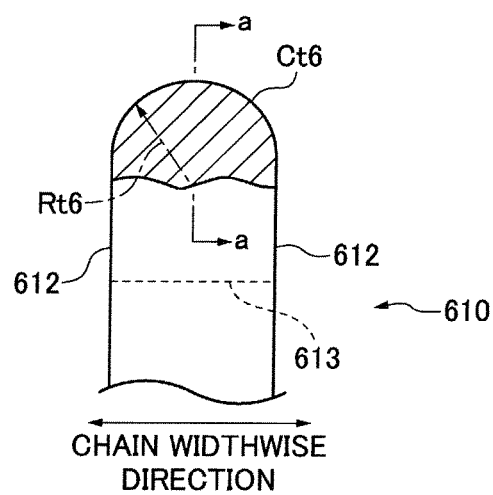
Figure 5C:
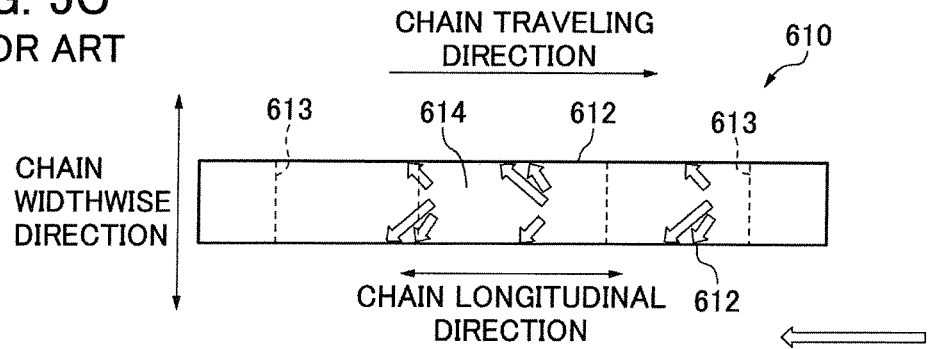

As shown in FIGS. 3A-3C, the link plate 150 has a pair of teeth 151, a pair of side surfaces 152 facing in the widthwise direction, and a back surface 154 that extends from one of the side surfaces 152 to the other. The back surface is configured for sliding contact with surface 4 of the chain guide 1 (FIG. 1).

The link plate 150 is also provided with a pair of pin holes 153. In FIGS. 3A-3C, the teeth 151 correspond to the teeth 111 and 121 of the first and second plates 110 and 120. The side surfaces 152 correspond to the side surfaces 112 of the first plates 110 and to the side surfaces 122 of the second plates 120. The back surface 154 corresponds to the back surfaces 114 and 124 of the first and second plates 110 and 120. The pin holes 153 correspond to the pin holes 113 and 123, and extend from one side surface of the plate to the opposite side surface.

As shown in FIGS. 3A and 3B, a portion 154a of the back surface 154 has a convex, substantially arc-shaped, curvature both in the longitudinal and widthwise directions of the chain.

The longitudinal curve is curve Ce in FIG. 3A, and the widthwise curve is curve Ct in FIG. 3B. The surface portion 154a encompasses the sliding portion of the back surface 154.

The longitudinal curve Ce, seen in FIG. 3A, is a curve in a plane which is orthogonal to the direction of the width of the chain and which includes the center of curvature of curve Ce. Similarly, the widthwise curve Ct, seen in FIG. 3B, is a curve in a plane parallel to the direction of the width of the chain, and which includes the center of curvature of curve Ct.

When a term is modified by the word "substantially," as used herein, the term should be understood to encompass not only the specific structure described by the term, but also structures that correspond to the specific structure but have minor deviations that make no significant difference in operation or effect.

The longitudinal curve Ce and the widthwise curve Ct can deviate from a true arcuate shape. For example, each curve can be composed of connected arc-shaped segments having different radii of curvature, including straight line segments having an infinitely long radius of curvature. Thus, the term "substantially arc-shaped" is intended to encompass both a true arc-shaped curvature having a constant radius, as well as a curve composed of a plurality of connected segments each of which has a different radius of curvature, so long as the operation and effect of the curvature is the same. In the latter case, the radius of curvature can be considered to be the smallest of the radii of curvature of the plural segments constituting the curve, not taking into account chamfers at the locations at which the edges of the backs of the link plates meet the side surfaces of the link plates, and not taking onto account end portions of the backs of the link plates that do not come into contact with the sliding contact surfaces of chain guides. For example, the curvature of a curved surface can be composed of arcuate segments having different radii of curvature, and may even include straight line segments having an infinite radius of curvature. In such a case, the smallest of these radii is considered to be the radius of curvature of the surface.

As shown in FIG. 3A, the longitudinal curve Ce extends in the longitudinal direction of the chain at least through a distance spanning the distance S1 between the pin holes 153. That is, the curve Ce extends through two parallel imaginary planes perpendicular to a center line extending from the center of one pin hole to the center of the other pin hole and tangent respectively to the points on the pin holes that most closely approach each other.

In the embodiment shown in FIG. 3A, the longitudinal curve Ce extends in both longitudinal directions beyond a range spanning the distance S2 between the centers of the pin holes, but within a range spanning the distance S3 corresponding to the distance between the most widely separated points on the respective pin holes.

As shown in FIG. 3B, the widthwise curve Ct extends across a widthwise distance S5, which corresponds to distance S4 from one side surface of the link plate to the other less the widthwise dimensions of any chamfers formed at the edges of the back surface of the link plates. In the link plate 150 shown in FIG. 3B there are no chamfered portions, and the distance S5 is therefore equal to distance S4.

In a link plate according to the invention, the back surface of the plate is convex both in widthwise and longitudinal cross-sections, and has finite radii of curvature Rt and Re. The radius of curvature Rt of the widthwise curve Ct in any arbitrarily selected widthwise cross-section within the longitudinal range of curve Ce is at least as great as the radius of curvature Re of the longitudinal curve Ce in the same longitudinal range. In other words, Rt is equal to or greater than Re.

When the chain travels as shown in FIG. 3C, air resistance causes oil adhering to the back 154 of the link plate to flow on the curved surface 154a both in the longitudinal direction and widthwise toward the respective side surfaces 152, as indicated by arrows.

As shown by arrows in FIG. 3A, oil reaching the side surfaces of the link plate from the back surface then flows on the respective side surfaces 152, through small widthwise gaps between the adjacent link plates, and into the pin holes 153. Thus the oil lubricates the gaps between the connecting pins 103 (see FIGS. 1 and 2) and the wall surfaces 155 of the pin holes.

In general, more oil will flow into the pin hole 153b (FIG. 3A) which is to the rear of the link plate in the direction of chain travel, than into the front pin hole 153a.

In an embodiment in which the backs of the link plates of both sets, i.e., the guide links and the non-guide links, have the configuration described above and are positioned to come into sliding contact with a chain guide, oil that flows into the rear pin hole of each plate also flows into the front pin holes of adjacent overlapping plates. Therefore, the flow of oil into the front and rear pin holes of each of the plates is well-balanced. The back surfaces 134 of the guide plates 130 (FIGS. 1 and 2) can have the same shape with that of the back surfaces 154 of the link plates 150. That is, the longitudinal cross-section in a curved portion 134a of the guide plate 130 can be longitudinal curve similar to the longitudinal curve Ce of the back surface 154 of a link plate, and the widthwise cross-section can be a widthwise curve similar to the widthwise curve Ct of the back surface 154. In this case, the guide plates 130 also exhibit improved oil holding performance, and improve lubrication of the area of contact between the chain and the guide or guides on which the chain slides. The gradual widthwise curvature of the backs of the guide link plates also contributes to a reduction in contact pressure compared to the contact pressure in the case of guide plates having a widthwise curvature with a relatively small radius.

In the embodiment described above, the oil holding performance of the back surfaces 154 of the link plates, both in the guide rows 101 and in the non-guide rows 102, is significantly improved compared to the case in which the radius of curvature of the widthwise curve is smaller than the radius of curvature of the longitudinal curve. Therefore, lubrication of the area of sliding contact between the backs of the link plates and the shoe of a guide is improved. Contact pressure between the curved surface 154a and the shoe 3 is also reduced compared to a case in which the backs of the link plates have a widthwise curvature with a relatively small radius. Therefore friction between the chain and the shoe is reduced and frictional losses in a chain transmission can be reduced. In addition, the durability of the chain is improved by the suppression of wear resulting from the gradual widthwise curvature of the backs of the link plates.

The oil on the back surfaces 154 also flows along the side surfaces of the link plates into the pin holes, lubricating the area of contact between the connecting pins 103 and the walls 155 of the pin holes, improving the durability of the chain by reducing elongation due to wear at the areas of contact between the connecting pins and the walls 155 of the pin holes.

In a first modification of the chain described above, the link plates 120 of the non-guide rows 102 are arranged for sliding contact with the guide surface 4, while the backs of the link plates 110 of the guide rows 101 are recessed relative to the backs of the link plates of the non-guide rows so that they do not contact the guide surface. In this embodiment the whose radius of curvature Rt of the widthwise curve Ct is at least as great as the radius of curvature Re of the longitudinal curve Ct, frictional loss is reduced and suppression of wear between the back surfaces 124 and the shoe is realized.

Flow of oil from the back surfaces 124 and along the sides of the link plates 120 is mostly into the rear pin holes of the non-guide link plates and into the front pin holes of the guide link plates suppresses wear elongation of the chain. In addition, the fact that the backs of the guide link plates do not contact the shoe results in a reduction in the contact area between the chain and the guide and a reduction in frictional losses.

A second modification is similar to the first modification except that the back surfaces in which Rt is at least as great as Re and which contact the guide in sliding relationship are back surfaces of the link plates of the guide rows, and the link plates of the non-guide rows are recessed so that they do not contact the guide. The performance of this modification is essentially the same as that of the first modification.

In a third modification, which is applicable to the main embodiment as well as to either of the two modifications described above, the backs of the guide plates 130 are recessed relative to the link plates that contact the guide surface so that the guide plates remain out of contact with the surface 4 of the shoe on the chain guide 1.

Because the guide plates 130 do not contact the shoe, the area of contact between the chain and the shoe is reduced, and frictional losses are reduced accordingly. In this embodiment, the connecting pins 103 may be fixed to the guide plates, e.g., by press-fitting.

Other modifications can be made to the chain described. For instance, whereas the chain in the embodiments described is a silent chain composed of toothed link plates, advantages of the chain of the invention may be realized in other kinds of transmission chains such as roller chains or rollerless bushing chains.

What is claimed is:

1. A chain comprising:
   a plurality of first links, each composed of at least one first link plate;
   a plurality of second links each composed of at least one second link plate, the first and second links being disposed in alternating relationship along a longitudinal direction of the chain, with each link plate of each first link being interleaved with link plates of two adjacent second links;
   the link plates having pin holes for receiving connecting pins, and side surfaces; and
   a plurality of connecting pins extending in a widthwise direction of the chain through pin holes in the link plates of the first and second links and articulably connecting the first and second links of the chain;
   wherein each of the link plates of at least one of said pluralities of links is a sliding contact link plate;

wherein the sliding contact link plates of the chain have back surfaces for sliding contact with a chain guide, the longitudinal cross sections of each of said back surfaces being in the form of a convex, substantially arc-shaped, longitudinal curve, and the widthwise cross sections of each of said back surfaces being in the form of a convex, substantially arc-shaped, widthwise curve; and wherein the radius of curvature of the widthwise curve of the back surface of each of the link plates of said at least one of said first and second pluralities of links is at least as great as the radius of curvature of the longitudinal curve of the back surface of the same link plate.

2. The chain according to claim 1, wherein the chain is a silent chain; each of said first links is a guide row composed of a pair of guide plates spaced from each other in the widthwise direction, and at least one first link plate disposed between the pair of guide plates; wherein each of said second links is a non-guide row composed of a plurality of second link plates; and wherein the link plates of the links of both of said pluralities of link plates are sliding contact link plates.

3. The chain according to claim 2, wherein the guide plates have backs positioned in relation to the link plates of both of said pluralities of links such that the backs of the guide plates remain out of sliding contact with a chain guide while link plates of adjacent first and second links are in sliding contact with said chain guide.

4. The chain according to claim 1, wherein the chain is a silent chain; each of said first links is a guide row composed of a pair of guide plates spaced from each other in the widthwise direction, and at least one first link plate disposed between the pair of guide plates; each of said second links is a non-guide row composed of a plurality of second link plates; wherein the link plates of said second links are sliding contact link plates, and the link plates of the first links are positioned in relation to the link plates of the second links so that the link plates of the first links remain out of contact with a chain guide while link plates of adjacent second links are in sliding contact with the same chain guide.

5. The chain according to claim 4, wherein the guide plates have backs positioned in relation to the link plates said plurality of second links such that the backs of the guide plates remain out of sliding contact with a chain guide while link plates of adjacent second links are in sliding contact with said chain guide.

6. The chain according to claim 1, wherein the chain is a silent chain; each of said first links is a guide row composed of a pair of guide plates spaced from each other in the widthwise direction, and at least one first link plate disposed between the pair of guide plates; each of said second links is a non-guide row composed of a plurality of second link plates; and wherein the link plates of said first links are sliding contact link plates, and the link plates of the second links are positioned in relation to the link plates of the first links so that the link plates of the second links remain out of contact with a chain guide while link plates of adjacent first links are in sliding contact with the same chain guide.

7. The chain according to claim 6, wherein the guide plates have backs positioned in relation to the link plates said plurality of first links such that the backs of the guide plates of each of said first links remain out of sliding contact with a chain guide while adjacent link plates of said plurality of first links are in sliding contact with said chain guide.

* * * * *